US012735268B2

(12) United States Patent
Nishikawa

(10) Patent No.: US 12,735,268 B2

(45) Date of Patent: Sep. 15, 2026

(54) CONVEYING APPARATUS AND CONVEYING METHOD

(71) Applicant: DAIFUKU CO., LTD., Osaka (JP)

(72) Inventor: Tadashi Nishikawa, Hino-cho (JP)

(73) Assignee: DAIFUKU CO., LTD., Osaka (JP)

( * ) Notice: Subject to any disclaimer, the term of this patent is extended or adjusted under 35 U.S.C. 154(b) by 568 days.

(21) Appl. No.: 18/229,301

(22) Filed: Aug. 2, 2023

(65) Prior Publication Data

US 2024/0083689 A1 Mar. 14, 2024

(30) Foreign Application Priority Data

Sep. 8, 2022 (JP) ................................ 2022-142618

(51) Int. Cl.
*G06F 7/00* (2006.01)
*B65G 43/00* (2006.01)

(52) U.S. Cl.
CPC ........ *B65G 43/00* (2013.01); *B65G 2203/041* (2013.01)

(58) Field of Classification Search
CPC ...... B65G 1/0457; B65G 43/00; B65G 43/06; B65G 43/08; B65G 35/00; B65G 35/06; B65G 47/02; B65G 47/04; B65G 47/36; B65G 47/52; B65G 47/60; B65G 2203/041; B65G 2203/0208; B65G 2203/044; B65G 2201/02; B65G 11/00; B65G 11/02; B65G 11/03; H10P 72/3221; H10P 72/0606; H10P 72/0608; H10P 72/30; H10P 72/3206;
(Continued)

(56) References Cited

U.S. PATENT DOCUMENTS 10,037,908 B2 * 7/2018 Ota ..................... H10P 72/3221
2003/0001118 A1 1/2003 Murata
(Continued)

FOREIGN PATENT DOCUMENTS

JP 5936174 B2 6/2016
JP 2021-187563 A 12/2021
(Continued)

OTHER PUBLICATIONS

Notice of Reasons for Refusal issued in related Japanese Patent Application No. 2022-142618 dated Jun. 27, 2025.
(Continued)

*Primary Examiner* — Yolanda R Cumbess
(74) *Attorney, Agent, or Firm* — RENNER, OTTO, BOISSELLE & SKLAR, LLP

(57) ABSTRACT

A conveying apparatus is capable of conveying an object supported by a support along a vertical direction in a non-restricted area and a restricted area narrower than the non-restricted area. The conveying apparatus has a first detection device, a second detection device and a controller. The first detection device detects whether a runout of the conveyed object supported by the support from a normal position is within or outside the non-restricted area. The second detection device detects whether the runout from the normal position of the object supported by the support is within or outside the restricted area. The controller controls the conveyance operation of the object to be conveyed by the support based on the detection results of the first detection device and the second detection device.

12 Claims, 8 Drawing Sheets

(58) Field of Classification Search
CPC ...... H10P 72/3222; H10P 72/53; H10P 72/33; H10P 72/3308; H10P 72/50
USPC .................................................. 700/213, 230
See application file for complete search history.

(56) References Cited

U.S. PATENT DOCUMENTS

| | | | | |
|---|---|---|---|---|
| 2015/0203333 | A1* | 7/2015 | Ota | B66C 13/18 212/276 |
| 2020/0118853 | A1 | 4/2020 | Harasaki | |
| 2020/0223640 | A1 | 7/2020 | Shin et al. | |
| 2024/0128113 | A1* | 4/2024 | Shimizu | H10P 72/0606 |

FOREIGN PATENT DOCUMENTS

| | | | | |
|---|---|---|---|---|
| JP | 7306596 | B2 | 7/2023 | |
| WO | WO-2020121765 | A1 * | 6/2020 | H10P 72/50 |

OTHER PUBLICATIONS

Search Report issued in Singapore Patent Application No. 10202302139Q dated Jan. 24, 2025.

* cited by examiner

CONVEYING APPARATUS AND CONVEYING METHOD

FIELD OF THE INVENTION

The present invention relates to a conveying apparatus and to a conveying method.

BACKGROUND OF THE INVENTION

Known conveying apparatus include a carrier running along ceiling rails laid on the ceiling of a building, and a support installed on the carrier, configured to be able to move vertically downward from the carrier conveyor and configured to be able to move vertically upward toward the carrier (see JP2021-187563A, especially FIG. 1). The support supports objects to be conveyed. The objects to be conveyed is conveyed vertically by the support and horizontally by the carrier. On the floor inside the building, a processing device is installed to perform a predetermined treatment on the object to be conveyed. The processing device has a platform for receiving the object from the support and placing the object thereon.

The object supported by the support, is conveyed to a position above the processing device by the carrier. From the position above the processing device, the support moves vertically downward, and the object is fed into the processing device and placed on the platform. The object placed on the platform is subjected to a prescribed treatment by the processing device. After treatment, the object is moved upward from the processing device by the support, and then conveyed to another location by the carrier.

As the processing device, a structure with an operation panel for the processing device and other equipment installed above the platform is known. The structure is called a "cover." In such a processing unit, the support supporting the object passes through the interior of the structure when the object is lowered toward the platform before processing or when the processed object is lifted from the platform.

However, the interior of the structure is narrower than the rest of the structure. Therefore, when the support supporting the object passes through the structure, special care must be taken to prevent problems such as contact or collision of the object or support with the structure. The reason why such consideration is necessary is that, for example, there is a possibility that displacement from the specified position may occur due to shaking during the lifting and lowering operation of the support and the object, that the deviation from the normal position of the object by the support may occur, or that the stop position may deviate from the normal position when the object is stopped above the processing unit.

The same situation can be assumed to occur in a variety of cases, not only when a structure with a narrow interior is installed in the processing device as described above, but also when the object is conveyed along the vertical direction.

SUMMARY OF THE INVENTION

The object of the present invention is to prevent the occurrence of troubles associated with the existence of a narrow areas when conveying an object to be conveyed along a vertical path having the narrow areas.

To achieve the object, according to the invention, a conveying apparatus capable of conveying an object to be conveyed supported by a support along a vertical direction in a non-restricted area and a restricted area narrower than the non-restricted area comprises;

- a first detection device configured to detect whether a runout of the object supported by the support from a normal position thereof is within or outside the non-restricted area in a first direction intersecting the vertical direction,
- a second detection device configured to detect whether the runout of the object supported by the support from the normal position thereof is within or outside the restricted area in a second direction intersecting the vertical direction, and
- a controller configured to control a conveying operation of the object to be conveyed by the support based on the detection results of the first detection device and the second detection device.

According to the conveying apparatus of the present invention, the first detection device can detect whether the runout of the object to be conveyed supported by the support from its normal position is within or outside the range of the non-restricted area in the direction that intersects the vertical direction. According to the conveying apparatus of the present invention, the second detection device can detect whether the runout of the object supported by the support from its normal position is within or outside the restricted area, which is narrower than the non-restricted area, in the direction that intersects the vertical direction. Therefore, according to the conveying apparatus of the present invention, when the object is supported by the support and conveyed in the vertical direction, even if the non-restricted area and the restricted area exist, the conveyance control can be performed appropriately corresponding to each area.

According to the conveying apparatus of the present invention, it is preferable that

- the controller is configured to control the conveying operation of the object by the support based on the detection result of the first detection device in the non-restricted region, and
- the controller is configured to control the conveying operation of the object by the support based on the detection result of the second detection device in the restricted area.

In this case, the controller can make the conveying operation of the object to be conveyed appropriately corresponding to the non-restricted area, as well as the conveying operation of the object to be conveyed appropriately corresponding to the restricted area.

According to the conveying apparatus of the present invention, it is preferable that the conveying apparatus further comprises;

- a processing device for processing the object, the processing device having the non-restricted area and the restricted area, and
- a carrier that travels horizontally at a position above the processing device while holding the support,
- wherein the support conveys the object between the position above the processing device and a position for placing the object in the processing device by raising and lowering operations thereof.

In this case, the conveyance control can be performed appropriately corresponding to the non-restricted and restricted areas respectively in the processing device for processing the object to be conveyed.

According to the conveying apparatus of the present invention, it is preferable that a plurality of processing devices is provided, including a first processing device with the restricted area and a second processing device without the restricted area.

In this case, the first processing device which has the restricted area can perform control based on detection results from both the first and second detection devices. In contrast, the second processing device, which does not have the restricted area, can perform control based only on the detection results from the first detection device. Therefore, reliable results can be obtained with simple control.

According to the conveying apparatus of the present invention, it is preferable that at least one of the controller, the carrier and the support has map information about at least one of the restricted and non-restricted areas at each processing device.

In this case, while recognizing the location of the restricted area and the non-restricted area in each processing device, conveyance control can be performed appropriately for each of the non-restricted area and restricted area, thus enabling more reliable conveyance control.

According to the conveying apparatus of the present invention, it is preferable that the map information includes the location of at least one of the restricted area and the non-restricted area along the movement path of the support.

In this case, highly accurate control that reliably recognizes the location of the existence of restricted area and non-restricted area along the movement path of the support can be performed.

According to the conveying apparatus of the present invention, it is preferable that the conveying apparatus further comprises a position detection device to detect the position of the support along the movement path thereof.

In this case, since the conveyance operation in the non-restricted and restricted areas can be controlled while detecting the position of the support supporting the object to be conveyed, reliable control can be performed.

According to the conveying apparatus of the present invention, it is preferable that the controller is configured to control a speed of movement of the support along the movement path thereof.

According to the present invention, it is possible to control the conveyance operation in various ways based on the detection results of the first and second detection devices. Among other things, the speed of movement of the support along the movement path of the support can be controlled, for example, by performing conveyance at a low speed only in restricted areas and not performing such control in non-restricted areas, thereby ensuring efficient conveyance.

In particular, according to the present invention, it is preferable that the controller is configured to reduces the speed of movement of the support, when the second detection device detects that the runout of the object supported by the support from the normal position is outside the restricted area, more than when the runout of the object supported by the support from the normal position is within the restricted area.

In this case, during actual conveyance, even if the runout of the object to be conveyed supported by the support from its normal position is outside the restricted area, for example, if this runout is based on shaking of the support or the object, the runout will decrease accordingly when the shaking stops. At that time, the support can be moved at a low speed without stopping, and the support can pass through the restricted area without major trouble, thus conveyance can be performed without lowering conveyance efficiency.

According to the conveying apparatus of the present invention, it is preferable that the first detection device is configured to detect a first physical quantity that changes between when the runout of the object from the normal position is within the non-restricted area and when the runout of the object from the normal position is outside the non-restricted area, and the second detection device is configured to detect a second physical quantity that changes between when the runout of the object from the normal position is within the restricted area and when the runout of the object from the normal position is outside the restricted area.

In other words, as the first and second detection devices, detection devices that can detect on any physical principle can be employed as appropriate.

According to the conveying apparatus of the present invention, it is preferable that the conveying apparatus further comprises;

a light emitting device provided on the carrier to emit light beam toward the support, a reflective member provided on the support and/or the object to reflect the light beam from the light emitting device, and a light intensity detecting device installed on the carrier to detect the intensity of light reflected from the reflective member, wherein;

the reflective member has a first reflector and a second reflector, the reflectance of which differs from each other, the first reflector is formed in a first size corresponding to the non-restricted area, the second reflector is formed in a second size corresponding to the restricted area, the first detection device is configured to detect whether the runout of the object from the normal position is within or outside the non-restricted area by a first difference in the light intensity of the reflected light detected by the light intensity detection device, and the second detection device is configured to detect whether the runout of the object from the normal position is within or outside the restricted area by a second difference in the light intensity of the reflected light detected by the light intensity detection device.

This allows the first and second detection devices to be specifically configured.

According to the conveying apparatus of the present invention, it is preferable that;

the first reflector is larger in size than the second reflector, and the second reflector is installed inside the area where the first reflector is installed.

This allows the reflective elements to be compactly configured.

According to a conveying method of the present invention, in conveying an object supported by a support in a horizontal direction at a position above a processing device by a carrier holding the support and raising and lowering the object between the carrier and the processing device by lowering the support from or raising the support toward the carrier, the conveying method comprises;

determining, by means of a control operation using map information in a controller, a presence or an absence of a restricted area narrower than a non-restricted area along a vertical direction and a location of the restricted area in the processing device, detecting, by a first detection device, whether a runout from a normal position of the object, which is supported by the support and conveyed, is within or outside the non-restricted area in a first direction intersecting the vertical direction, detecting, by a second detection device, whether a runout from the normal position of the object, which is supported by the support and conveyed, is within or outside the restricted area in a second direction intersecting the vertical direction, controlling, by the controller, the raising and lowering operation of the support based on a first detection result of the first detection device in the non-restricted area, and controlling, by the controller, the raising and lowering operation of the support based on a second detection result of the second detection device in the restricted area.

Therefore, according to the conveying method of the present invention, the first detection device can detect whether the runout of the object to be conveyed supported by the support from its normal position is within or outside the range of the non-restricted area in the direction that intersects the vertical direction. According to the conveying method of the present invention, the second detection device can detect whether the runout of the object to be conveyed supported by the support from its normal position is within or outside the restricted area, which is narrower than the non-restricted area, in the direction that intersects the vertical direction. Therefore, according to the conveying method of the present invention, when the object is supported by the support and conveyed in the vertical direction, even if a non-restricted area and a restricted area exist, conveyance control that appropriately corresponds to each area can be performed.

According to the present invention, even if the non-restricted area and the restricted area narrower than the non-restricted area exist when the object to be conveyed is supported by the support and conveyed in the vertical direction, conveyance control can be performed by appropriately responding to each area to prevent the occurrence of trouble.

DETAILED DESCRIPTION OF THE INVENTION

Figure 1:
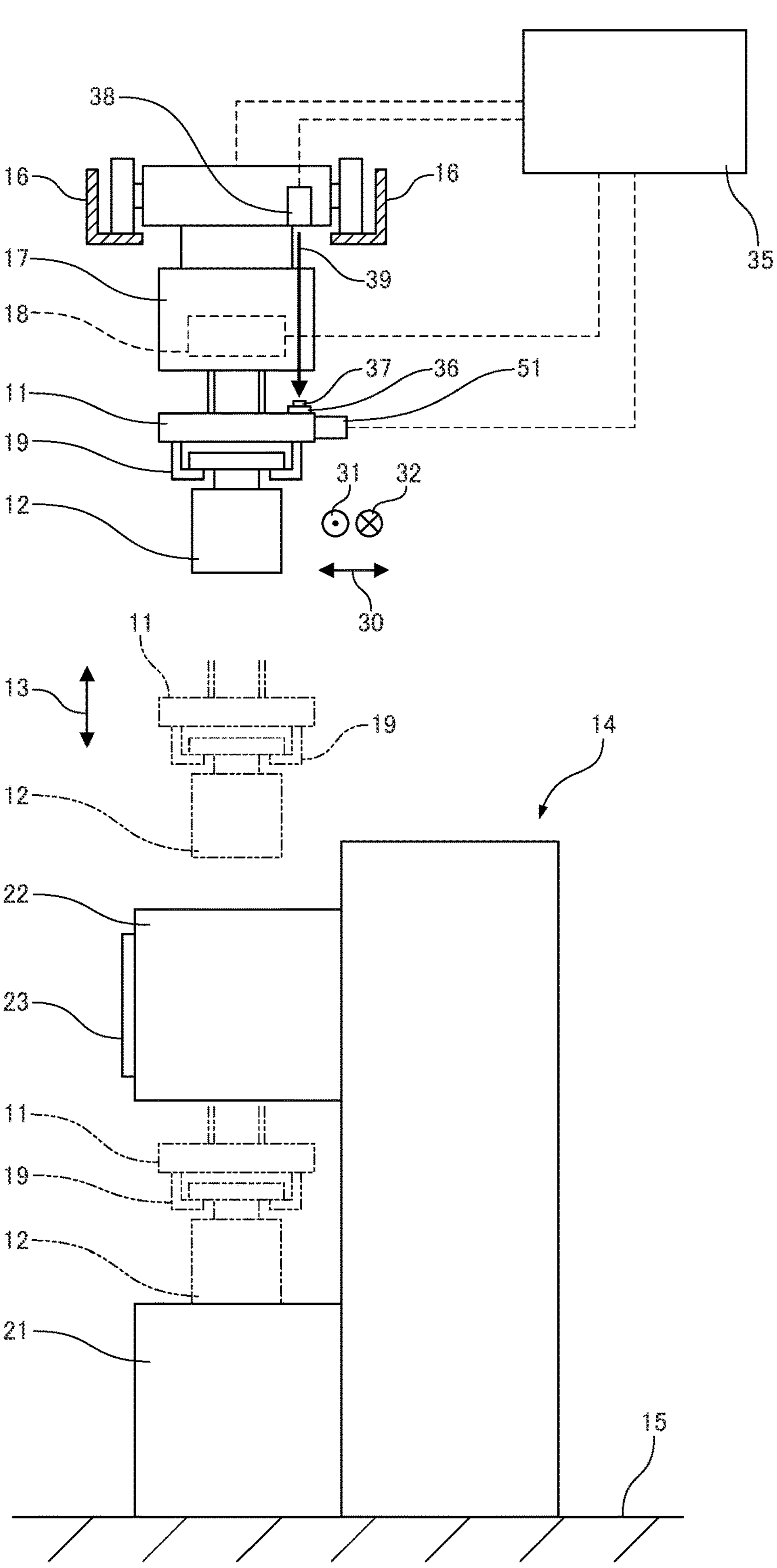
FIG. 1 is a figure showing an embodiment of a conveying apparatus according to the present invention.

As depicted in FIG. 1, which shows the embodiment of the conveying apparatus of the present invention, the conveying apparatus conveys an object 12 to be conveyed, supported by a support 11, along the vertical direction 13. FIG. 1 shows a processing device 14 for applying a predetermined processing to the object 12. The processing device 14 is installed on a floor 15 of a building.

At a position above the floor 15, a ceiling rail 16 is laid in a horizontal direction perpendicular to the paper surface in FIG. 1. A cart-type carrier 17 is provided that runs guided by the ceiling rail 16. The support 11 is provided in the carrier 17 and can move vertically downward from the carrier 17 toward the processing device 14 and also vertically upward from the processing device 14 toward the carrier 17. The carrier 17 has a driver 18 for moving the support 11 in the vertical direction. The support 11 is provided with a chuck 19 for releasably gripping the object 12. In the illustrated example, the chuck 19 is capable of suspending and supporting the object 12 in a gripped state.

The processing device 14 has a platform 21 for placing the object 12 to be processed. The object 12 is supported on the support 11 by the chuck 19 and is conveyed horizontally by the carrier 17 together with the support 11. The support 11 is moved downwardly along the vertical direction 13 by the driver 18, and the object 12 is placed on the platform 21 of the processing device 14. By moving the support 11 upwardly along the vertical direction 13 by the driver 18, the object 12 is carried from the platform 21 to a position above the processing device 14.

Once the object 12 is placed on the platform 21 of the processing device 14, the support 11 is moved above the object 12 by the driver 18, releasing the grip of the chuck 19 on the object 12. The object 12 is now placed on the platform 21 and is processed by the processing device 14 without being disturbed by the support 11.

When the object 12 has been subjected to a prescribed processing by the processing device 14, the support 11 is moved downward again along the vertical direction 13, and the chuck 19 again grips and supports the object 12 placed on the platform 21. The support 11 is then raised, and the object 12 is moved upward away from the processing device 14. In this state, the carrier 17 runs along the ceiling rail 16, and the object 12 is conveyed to a predetermined location.

It is possible that the object 12 on the placing platform 21 is processed while the chuck 19 is still holding the object.

The processing device 14 has a cover 22 above the platform 21. The cover 22 has a panel 23. The panel 23 is provided with buttons for operator operation and a display for display to the operator.

The support 11 supporting the object 12 to be conveyed passes through the interior of the cover 22 when lowering the object 12 toward the platform 21 and when lifting the object 12 from the platform 21 because the processing device 14 has a cover 22 over the platform 21.

However, the cover 22 is not sufficiently large compared to the support 11 including the chuck 19, and the object 12. Rather, the cover 22 is formed in a reasonably compact shape and dimensions as a component of the processing device 14. As a result, the support 11 and the object 12 gripped by the chuck 19 are forced to move along a narrower passageway when moving vertically through the interior of the cover 22 than when moving in any other location.

In this specification, the narrow space through which the support 11 and the object 12 pass inside the cover 22 is referred to as a "restricted area". The space other than the restricted area, which is not so narrow, is referred to as a "non-restricted area".

Figure 2:
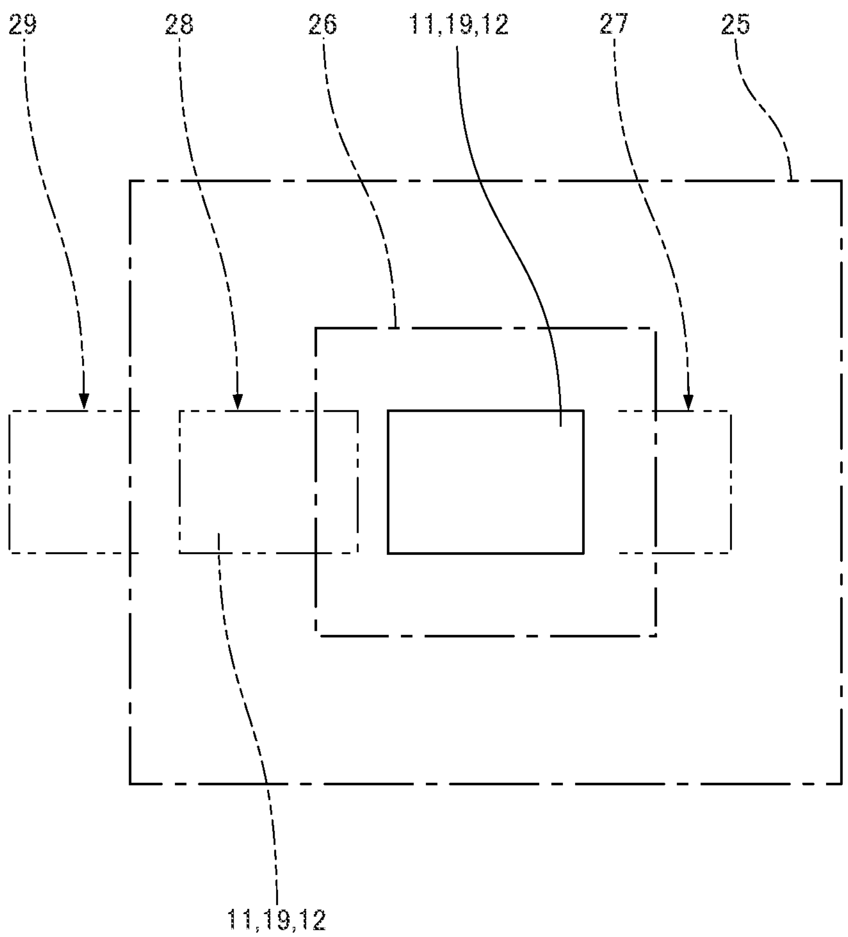
FIG. 2 is a figure conceptually showing a non-restricted area and a restricted area.

FIG. 2 is a plan view conceptually showing the non-restricted area 25 and the restricted area 26. By FIG. 2, it can be understood that the restricted area 26 for the support 11, chuck 19 and object 12 is narrow, while the non-restricted area 25 is wider than the restricted area 26.

To improve conveying efficiency, the support 11 must be raised and lowered as fast as possible. However, when the support 11 is raised and lowered at high speed, the accompanying shaking may occur. This shaking may cause the support 11 including the chuck 19, and the object 12 to swing from their normal positions. In FIG. 2, a first state in which the support 11, chuck 19 and object 12 are within the restricted area 26 is depicted by a solid line. In FIG. 2, a second state in which the support 11, chuck 19 and object 12 overhang to position 27 outside the restricted area 26, a third state in which the support 11, chuck 19 and object 12 are in position 28 within the non-restricted area 25, and a fourth state in which the support 11, chuck 19 and object 12 are in position 29 outside the non-restricted area 25 are shown together.

When runout from the normal position occurs in the support 11 including the chuck 19, runout also occurs in the object 12 accordingly. Conversely, when runout from the normal position occurs in the object 12, runout also occurs in the support 11 and chuck 19 accordingly. In other words, the support 11, chuck 19 and object 12 run out together. However, in the present invention, the object 12 is firmly supported by the chuck 19 of the support 11, and thus no misalignment is assumed to occur between the support 11 and chuck 19 and the object 12.

In FIG. 1, directions in which runout from the normal position in the support 11 and the object 12 can occur are illustrated by arrow 30, arrowhead 31 and nock 32. However, runout from the normal position with respect to the support 11 and the object 12 is not limited to these directions, but can occur in any direction in the horizontal plane intersecting the vertical direction.

The conveying apparatus shown in FIG. 1 is equipped with a first detection device and a second detection device, as will be described in detail in the specific example below. The first detection device detects whether the runout of the object 12 supported by the support 11, i.e., the support 11, chuck 19 and object 12, from the normal position is within or outside the non-restricted area 25 in the direction crossing the vertical direction, as shown in FIG. 2. In contrast, the second detection device detects whether the runout of the object 12 supported by the support 11, i.e., the support 11, chuck 19 and object 12, from the normal position is within or outside the restricted area 26 in the direction that intersects the vertical direction.

In the present invention, such first and second detection devices can be selected and used as desired by a person skilled in the art from among a number of generally known detection devices, as long as they have the detection function described above. In other words, the first detection device can perform the detection function as long as it detects the first physical quantity that changes when the runout from the normal position of the object 12 or the like is within the range of the non-restricted area 25 and when it is outside the range of the non-restricted area 25. The second detection device can perform its detection function as long as it detects a second physical quantity that changes when the runout from the normal position with respect to the object 12, etc. is within the restricted area 26 and when it is outside the restricted area 26.

The conveying apparatus shown in FIG. 1 further has a controller 35. The controller 35 controls a conveyance operation of the object 12 to be conveyed by the support 11 based on the detection results of the first detection device and the second detection device. Specific examples of controlling the conveyance operation include controlling an increase or decrease in the vertical movement speed of the support 11 by controlling the driver 18 by the controller 35, and stopping and restarting the movement of the support 11. However, other forms of control of the conveyance operation are also possible.

By controlling the conveyance operation of the object 12 by the support 11 in this manner, even if a non-restricted area 25 and a restricted area 26 exist when the object 12 is supported by the support 11 and conveyed in the vertical direction, the conveyance control can be performed appropriately corresponding to the respective areas 25 and 26. For example, within the non-restricted area 25, efficient conveyance can be performed by moving the support 11 at high speed. In the restricted area 26, the support 11 can be carefully conveyed by reducing the moving speed of the support 11 compared to the non-restricted area 25.

For example, if the support 11, chuck 19 and object 12 are within the restricted area 26 shown in FIG. 2, conveyance can be performed without any problems despite the presence of the restricted area 26. In this case, for example, even if the object 12 is conveyed at high speed over the entire range of vertical conveyance by the support 11, conveyance can also be performed without any problems.

Even if, for example, the support 11, chuck 19 and object 12 protrude into position 27 outside the restricted area 26 shown in FIG. 2, depending on the extent of the protrusion and other conditions, the support 11 may manage to pass through the restricted area 26 by simply slowing down without stopping its movement. Therefore, such cases can be handled successfully. For example, if the runout of the support 11, chuck 19 and object 12 is caused by shaking of the support 11, chuck 19 and object 12, it is efficient to reduce the moving speed of the support 11 in anticipation of the runout, since the runout often subsides gradually depending on the type and degree of shaking.

Furthermore, if, for example, the support 11, chuck 19 and object 12 remain unchanged while protruding into position 29 outside the range of the non-restricted area 25 shown in FIG. 2, the controller 35 can issue a warning to the operator to that effect or stop the support 11, etc. The controller 35 can also perform other appropriate controls based on the detection results of the first detection device and the second detection device.

There can be various forms of controlling the movement of the support 11 and the object 12 using the first and second detection devices. Among them, in particular, in the non-restricted area 25, it is suitable for achieving efficient control that the controller 35 controls the conveyance operation of the object 12 by the support 11 based on the detection result of the first detection device, i.e., whether the runout of the object 12 supported by the support 11 from its normal position is within or outside the range of the non-restricted area 25. In the restricted area 26, it is suitable for achieving efficient control that the controller 35 controls the conveyance operation of the object 12 by the support 11 based on the detection result of the second detection device, i.e., whether the runout of the object 12 supported by the support 11 from its normal position is within the restricted area 26 or outside the restricted area 26. This is because the control can respond well to the detection results.

While any device can be used as the first and second detection devices as described above, the following describes new first and second detection devices based on the present invention. These new detection devices are based on optical detection methods.

Figure 3:
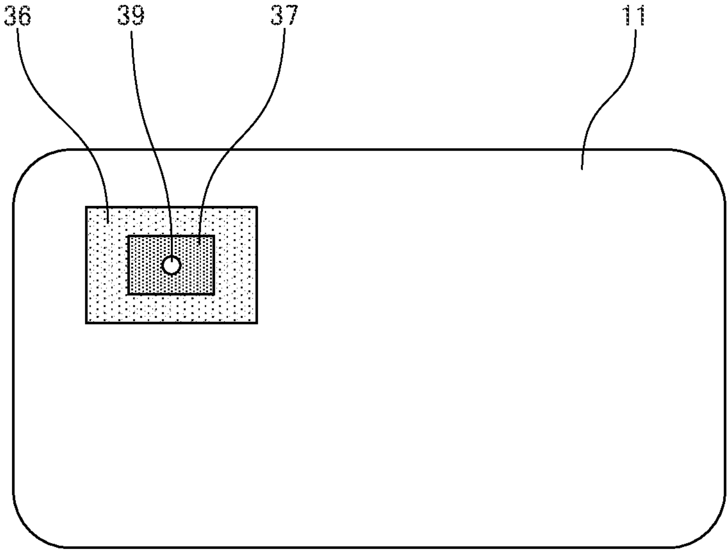
FIG. 3 is a figure showing an example of a reflective member.

In detail, as shown in FIG. 3, for example, a first reflective seal 36 and a second reflective seal 37 are provided on a top surface of the support 11. The first reflective seal 36 is formed in a size corresponding to the allowable range of runout of the support 11, chuck 19 and object 12 in the non-restricted area 25. The second reflective seal 37 is formed in a size corresponding to the allowable range of runout of the support 11, chuck 19 and object 12 in the restricted area 26. As shown in FIG. 2, since the restricted area 26 is narrower than the non-restricted area 25, the second reflective seal 37 formed corresponding to the allowable range of runout of the support 11, chuck 19 and object 12 in the restricted area 26 is smaller in size than the first reflective seal 36 formed corresponding to the allowable range of runout of the support 11, chuck 19 and object 12 in the non-restricted area 25.

As shown in FIG. 3, the second reflective seal 37 is provided inside an area where the first reflective seal 36 is provided. For example, if the first and second reflective seals 36, 37 are of a structure that is attached to an object, the first reflective seal 36 can be attached to the support 11 and the second reflective seal 37 can be further attached to a surface of the first reflective seal 36.

It is suitable for the first reflective seal 36 and the second reflective seal 37 to have different reflectance of light rays from each other and from the surface of the support 11. Specific examples of the configuration of the first and second detection devices using such first and second reflective seals 36 and 37 are as follows.

As shown in FIG. 1, the carrier 17 is provided with a light emitting/receiving device 38. The light emitting/receiving device 38 can emit a laser beam 39 downward along the vertical direction 13 toward a portion of the support 11 to which the first and second reflective seals 36, 37 are attached, and can also detect the amount of laser light reflected from below the light emitting/receiving device 38. Therefore, based on the magnitude of the runout of the support 11, the amount of reflected light changes when the laser beam 39 irradiates the second reflective seal 37, the first reflective seal 36 and the surface of the support 11, as shown in FIG. 3. As a result, it is possible to detect whether the laser beam 39 is irradiating the second reflective seal 37, the first reflective seal 36 or the support 11. This makes it possible to know the magnitude of the runout from the normal position in the horizontal direction for the support 11, the chuck 19 and the object 12.

Figure 4:
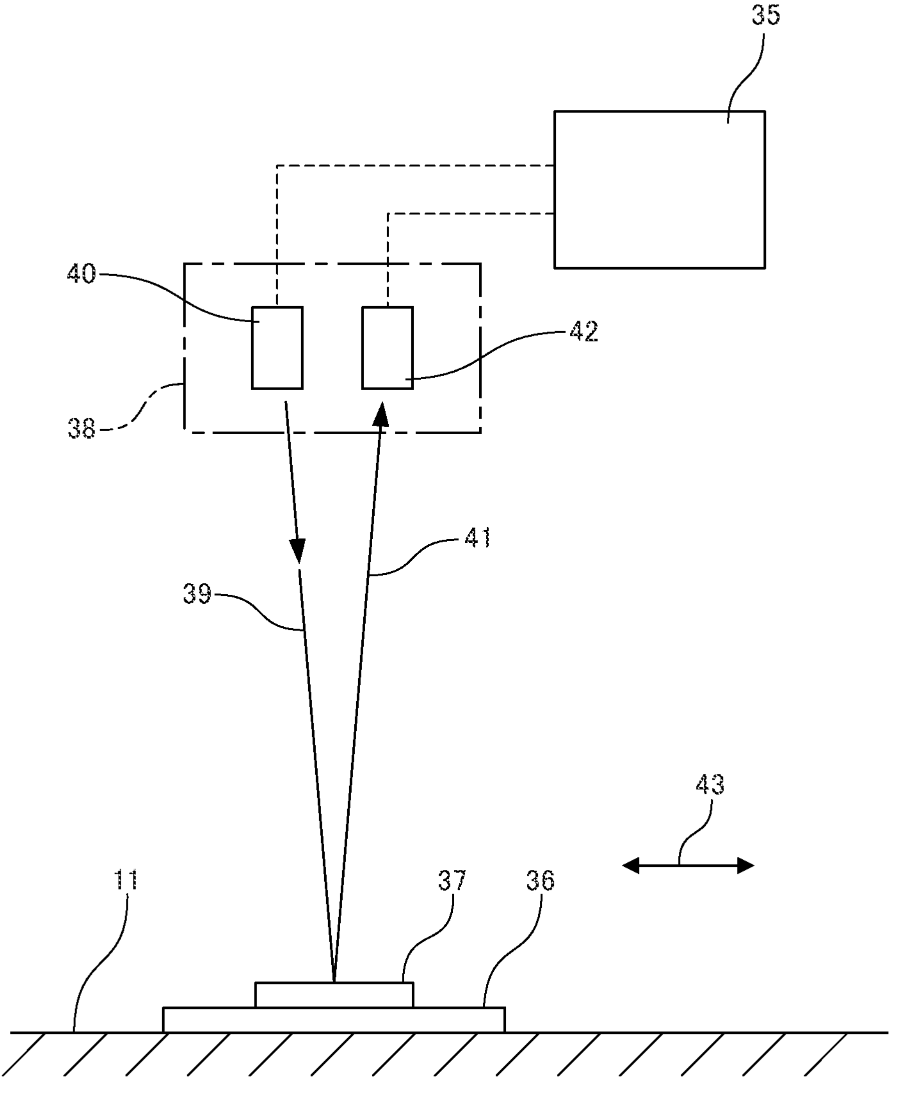
FIG. 4 is a figure showing the configuration of first and second detection devices.

FIG. 4 shows the detailed structure of the light emitting/receiving device 38. The light emitting/receiving device 38 is equipped with a light source 40 as a light ray emitting device for emitting a laser beam 39 and a light intensity sensor 42 as a light intensity detection device that receives reflected light 41 from the target, namely the second reflective seal 37, first reflective seal 36 and support 11, and detects its light intensity. The light source 40 projects the laser beam 39 by being controlled by the controller 35. It is suitable for accurate detection that the laser beam 39 is emitted in a spot shape as shown in FIG. 3. The light intensity sensor 42 sends a signal corresponding to the detected light intensity to the controller 35. The arrow 43 in FIG. 4 represents horizontal runout that can occur in the support 11, chuck 19 and object 12.

Figure 5:
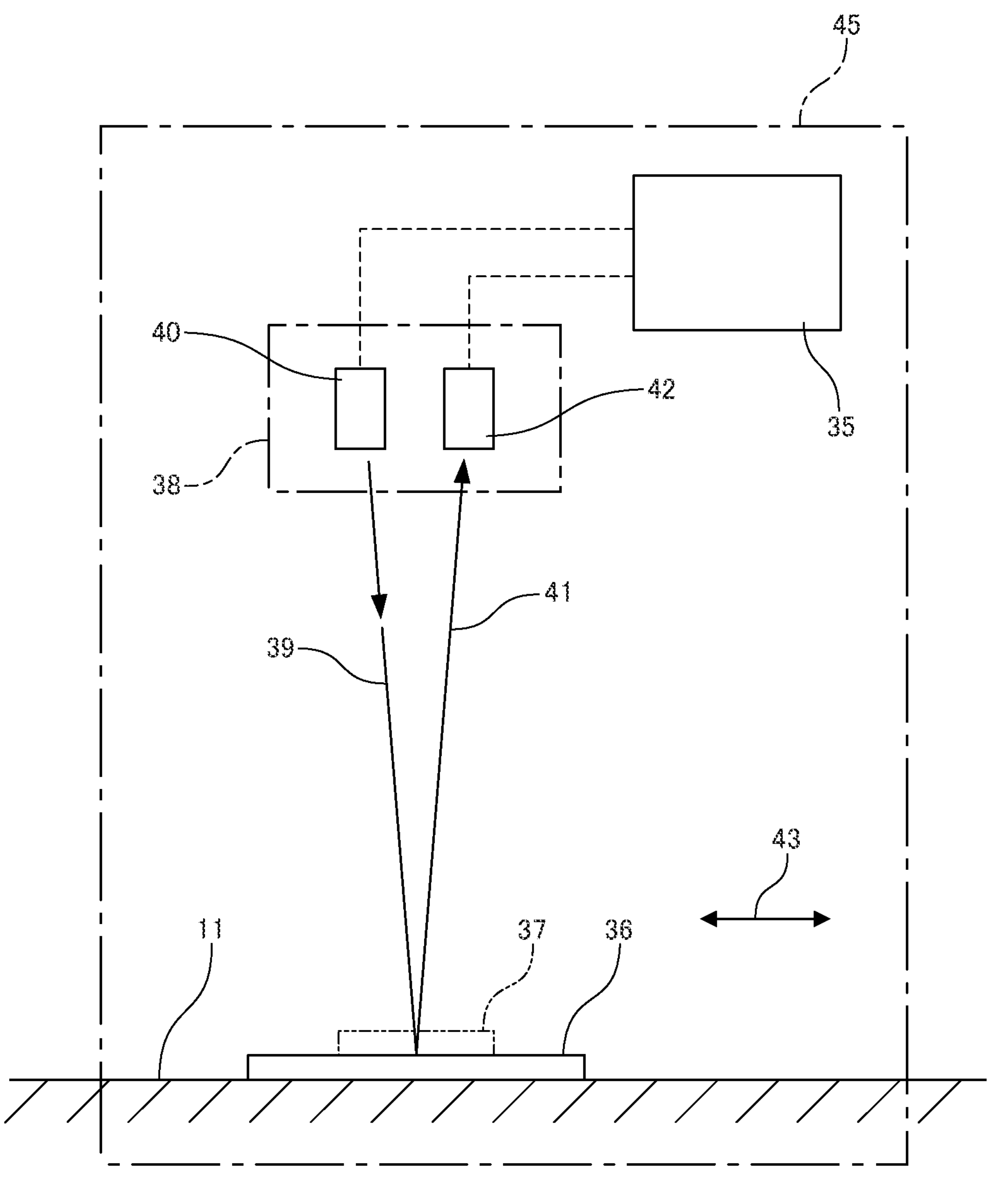
FIG. 5 is a figure showing the first detection device.

FIG. 5 shows the first detection device 45. In FIG. 5, the laser beam 39 from the light source 40 is irradiated onto the first reflective seal 36 in response to the size of runout that occurs in the support 11, chuck 19 and object 12, and the reflected light 41 from the first reflective seal 36 enters the light intensity sensor 42 and the light intensity is detected. Although the figure is omitted, when a large runout occurs, the laser beam 39 from the light source 40 is irradiated to the surface of the support 11, whose reflectance is different from that of the first reflective seal 36 and the second reflective seal 37, and the reflected light from the surface of the support 11 is incident on the light intensity sensor 42, and the light intensity is detected. The reflected light 41 from the first reflective seal 36 and the reflected light from the surface of the support 11 differ from each other in their light intensity. This is due to the difference in reflectance in the two. When the amount of reflected light 41 from the first reflective seal 36 enters the light intensity sensor 42, the controller 35 determines that the runout generated in the support 11, chuck 19 and object 12 is within the non-restricted area 25 shown in FIG. 2. When the light reflected from the surface of the support 11 enters the light intensity sensor 42, the controller 35 determines that the runout generated in the support 11, chuck 19 and object 12 is outside the range of the non-restricted area 25 shown in FIG. 2. The first detection system 45 is systematically constructed by such a detection system.

Figure 6:
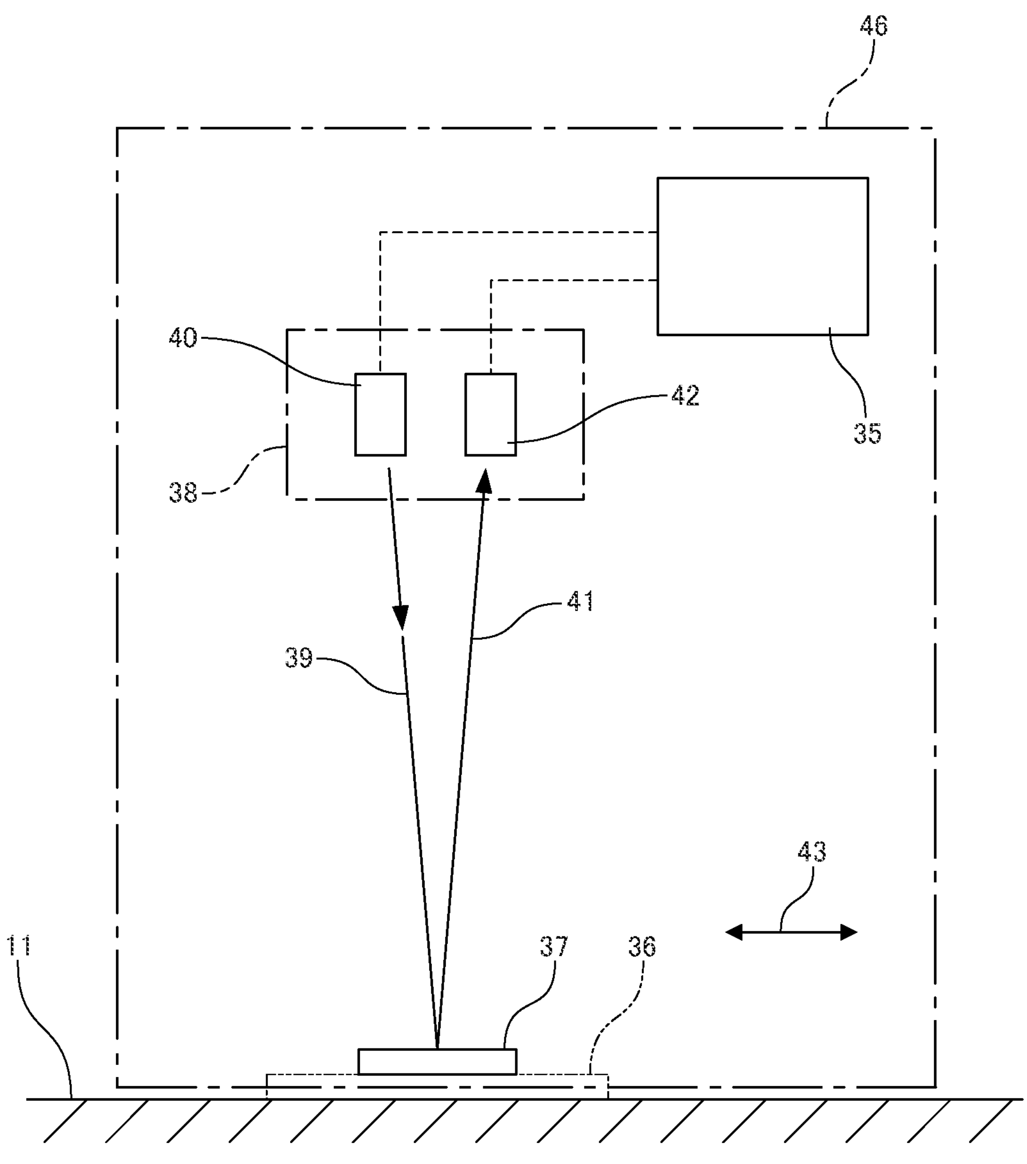
FIG. 6 is a figure showing the second detection device.

FIG. 6 shows the second detection device 46. As in the case of the first detection device 45, the laser beam 39 from the light source 40 is emitted to the second reflective seal 37 in response to the size of runout that occurs in the support 11, chuck 19 and object 12, and the reflected light 41 from the second reflective seal 37 enters the light intensity sensor 42 and is detected. When a large runout occurs, the laser beam 39 from the light source 40 is irradiated to the first reflective seal 36 and the support 11, whose reflectance is different from that of the second reflective seal 37, and the reflected light from the first reflective seal 36 and the support 11 is incident on the light intensity sensor 42, and the light intensity is detected. The light intensity of the reflected light from the second reflective seal 37 differs from the light intensity of the reflected light from the first reflective seal 36 and the support 11. When the light intensity corresponding to the reflected light 41 from the second reflective seal 37 enters and is detected by the light intensity sensor 42, the controller 35 determines that the runout generated in the support 11, chuck 19 and object 12 is within the restricted area 26 shown in FIG. 2. When the light intensity corresponding to the reflected light from the first reflective seal 36 and the support 11 is incident on and detected by the light intensity sensor 42, the controller 35 determines that the runout generated in the support 11, chuck 19 and object 12 is outside the restricted area 26 shown in FIG. 2. The second detection system 46 is systematically constructed by such a detection system.

In the above, an example in which the first reflective seal 36 and the second reflective seal 37 are installed on the support 11 was described. However, the first reflective seal 36 and the second reflective seal 37 can also be installed at other locations, for example, on the chuck 19 or the object 12. Alternatively, a plurality of first reflective seals 36 and second reflective seals 37, respectively, can be installed at a plurality of arbitrary locations on the support 11, the chuck 19 and the object 12. That is, the first reflective seal 36 and the second reflective seal 37 can be installed on the support 11 including the chuck 19 and/or on the object 12 to be conveyed.

In FIG. 3, rectangular shapes are illustrated as the first reflective seal 36 and the second reflective seal 37. This corresponds to the planar shapes of the restricted area 26 and non-restricted area 25 shown in FIG. 2, and is particularly adapted when the restricted area 26 is formed in the cover 22 of the processing device 14 as shown in FIG. 1. In contrast, if the planar shapes of the restricted area 26 and the non-restricted area 25 are other than rectangular, the shapes of the first reflective seal 36 and the second reflective seal 37 are also suitable to be made accordingly. In some cases, the restricted area 26 may be formed by only two specific sides that can constitute a rectangle, and so on.

In the above, particularly preferred examples of the first detection device 45 and the second detection device 46 are described. According to the above examples, the first detection device 45 and the second detection device 46 can be constructed by simply using a first reflective seal 36, a second reflective seal 37 that can be pasted over the first reflective seal 36, and a light emitting/receiving device 38.

However, the first detection device 45 and the second detection device 46 can be made in other configurations. For example, instead of a laminated structure, a frame-shaped first reflective seal 36 can be provided around the second reflective seal 37, the first and second reflective seals 36 and 37 can be arranged side by side, and other configurations can also be adopted. In the illustrated example, the required detection is performed by detecting the light intensity of the reflected light by the light intensity sensor 42 of the light emitting/receiving device 38, but other techniques can be employed. For example, image processing techniques or other optical methods can be used. Alternatively, a non-optical method, such as an electromagnetic displacement sensor, can also be used. In other words, a person skilled in the art can use any suitable detection means already known, as described above, in implementing the present invention.

Figure 7:
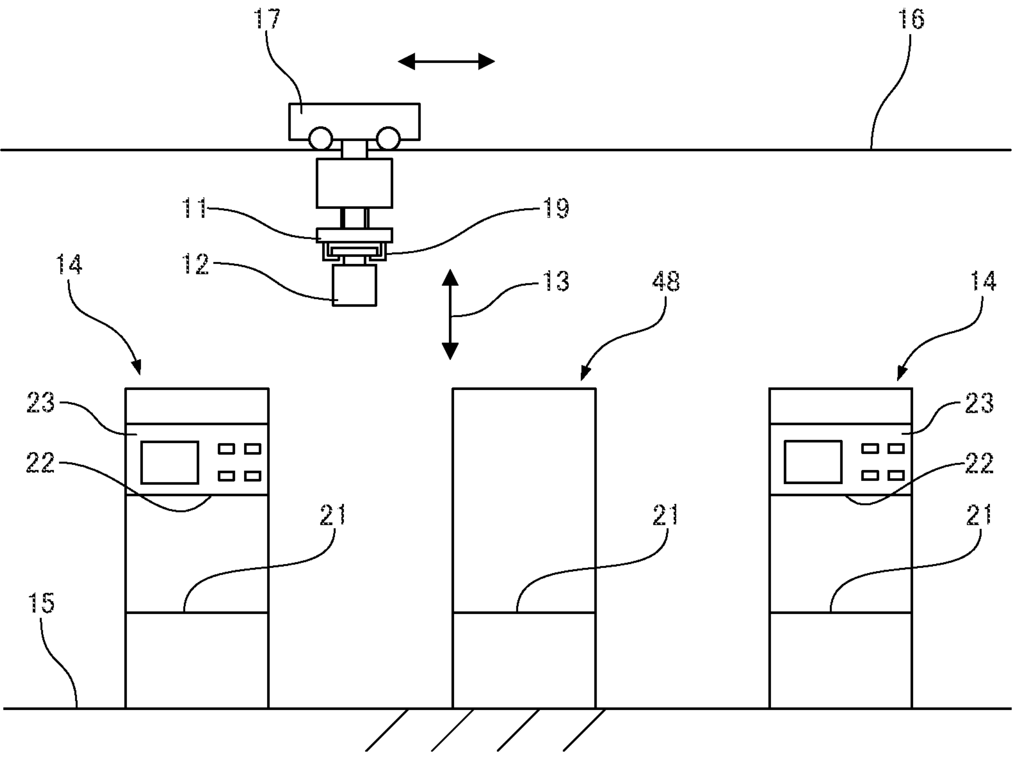
FIG. 7 is a figure showing an example of a conveying apparatus equipped with multiple processing devices.

As shown in FIG. 7, according to the conveying apparatus of the present invention, it is preferable that a plurality of processing devices 14, 14, . . . are installed on the floor 15, and the carrier 17 is suitably configured to travel along the ceiling rail 16 over the plurality of processing devices 14, 14, . . . . This makes it possible to apply multiple processes to a single object 12, as well as to simultaneously process multiple objects 12. In the example shown in FIG. 7, there are processing devices 14, 14 with covers 22, 22 and a processing device 48 without cover. In the processing unit 14 with the cover 22, it is preferable to perform the control described above by the controller 35. In contrast, in the case of the processing unit 48 without a cover, there is no restricted area 26, although there is a non-restricted area 25 shown in FIG. 2, so it is sufficient to perform only control based on the detection result of the first detection device 45, and there is no problem if control based on the detection result of the second detection device 46 is not performed.

Figure 8:
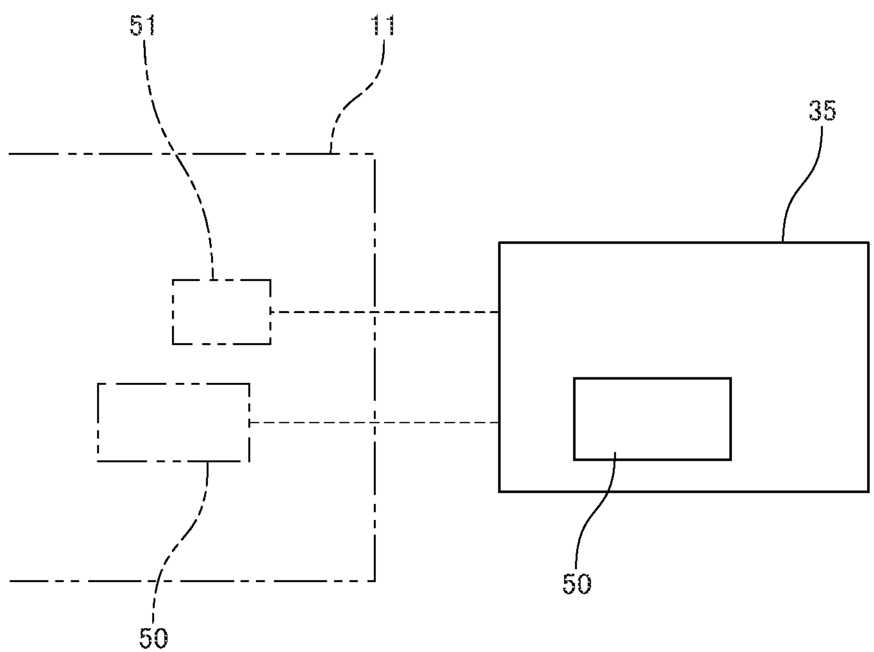
FIG. 8 is a figure showing map information and a position detection device.

As shown in FIG. 8, it is preferable for the control unit 35 to have a storage medium 50 that stores map information about each processing device 14 and the restricted area 26 in each processing device 14. Alternatively, the storage medium 50 storing the map information can be provided on the support 11 as shown in FIG. 8 or on the carrier 17, which is omitted in FIG. 8. In other words, the storage medium 50 storing the map information is suitably provided in at least one of the controller 35, the carrier 17 and the support 11. The storage medium 50 storing the map information can also be provided at another location other than the controller 35, the carrier 17 and the support 11. In these configurations, for example, the controller 35 can recognize the positions of the processing device 14 with the cover 22, or restricted area 26, and the processing unit 48 without the cover 22, or restricted area 26, shown in FIG. 7, and perform appropriate control according to the position information.

The map information stored in the storage medium 50 can include at least one of the location of the cover 22, or restricted area 26, and the location of the non-restricted area 25 along the path of movement in the vertical direction 13 shown in FIG. 1. With this configuration, the controller 35 can perform highly accurate control that reliably recognizes the location of the restricted area 26 and the non-restricted area 25 along the vertical direction 13.

As shown in FIG. 8 and FIG. 1, it is preferable for the conveying apparatus according to the invention to have a position detection device 51 that detects the position of the support 11 along the path of movement of the support 11 in the vertical direction 13. In this configuration, the conveyance operation in the non-restricted area 25 and the restricted area 26 can be controlled by the controller 35 while detecting the position of the support 11 supporting the object 12 to be conveyed, thus ensuring reliable control. For example, if the driver 18 for moving the support 11 in the vertical direction 13 is a motor or the like, the position detection device 51 can be configured with a rotary encoder linked to the motor.

As the position detecting device 51 is provided, the controller 35 can determine whether the support 11 and the object 12 to be conveyed are present at the installation position of the cover 22 or its neighboring position along the vertical direction 13, that is, whether they are in the restricted area 26 or its neighboring area. Thus, the controller 35 can adapt the support 11 and the object 12 to the position and area, and can more precisely control conforming to these positions and areas.

For example, if overhang of the support 11 and the object 12 from the restricted area 26 is detected by the second detection device 46 when the support 11 and the object 12 are in or near the restricted area 26, careful actions accordingly, such as, for example, stopping the lifting or reducing the lifting speed to see what happens, can be performed. Conversely, when the support 11 and the object 12 are not in or near the restricted area 26, i.e., when they are in the non-restricted area 25, the object 12 can be elevated without problems if it is contained within the non-restricted area 25, even if it overhangs from the restricted area 26.

If passing through the restricted area 26 is detected by the position detection device 51, then the lifting operation can be continued without problems, or the speed can be increased or otherwise controlled.

According to the conveying apparatus and the conveying method described above, it is also possible to perform quick and accurate control in the event of an earthquake. As is well known, there are two types of seismic waves: P waves, which are longitudinal waves, and S waves, which are transverse waves; P waves have smaller amplitude but faster propagation speed than S waves; S waves have larger amplitude but slower propagation speed than P waves. If P waves are observed during an earthquake, the support 11 should, in principle, stop moving. On the other hand, if the first and second detection devices 45 and 46 detect that the shaking of the support 11 and the object 12 is not very large when they are hit by a P wave during movement, the object 12 to be conveyed can be safely lowered to the platform 21 or safely raised to the carrier 17 before the S wave arrives.

The conveying apparatus and the conveying method described above can also be used for inspection of the processing devices 14 and 48. For example, if the object 12 to be conveyed or the support 11 including the chuck 19 collides with the cover 22 of the processing device 14, even though the detection result by the second detection device 46 was "inside the restricted area 26," a record of the collision is stored in the storage medium 50 in the control unit 35, this can point out a defective construction of the cover 22.

Having the described the invention, the following is claimed:

1. A conveying apparatus, comprising:

a processing device configured to process an object, the processing device comprising:

a platform on which the object to be processed is placed; and a cover positioned above the platform;

a support configured to support the object and convey the object along a vertical direction between a position above the processing device and a position on the platform of the processing device by moving through the cover;

a non-restricted area and a restricted area narrower than the non-restricted area, the non-restricted area and the restricted area being defined along a vertical movement path of the support in the processing device, and the restricted area being located inside the cover;

a first detection device configured to detect whether a runout of the object supported and conveyed by the support from a normal position of the object is within or outside the non-restricted area, the runout being a positional deviation of the object supported and conveyed by the support from the normal position in a direction intersecting the vertical direction;

a second detection device configured to detect whether the runout of the object supported and conveyed by the support from the normal position of the object is within or outside the restricted area;

a controller configured to control a conveying operation of the object to-be-conveyed by the support based on the detection results of the first detection device and the second detection device;

a carrier configured to hold the support such that the support is movable in the vertical direction;

a light emitting device provided on the carrier and configured to emit a light beam toward the support;

a reflective member provided on the support and/or the object and configured to reflect the light beam from the light emitting device; and a light intensity detecting device installed on the carrier and configured to detect an intensity of light reflected from the reflective member, wherein the first detection device is configured to detect a first physical quantity that changes between when the runout of the object from the normal position is within the non-restricted area and when the runout of the object from the normal position is outside the non-restricted area, wherein the second detection device is configured to detect a second physical quantity that changes between when the runout of the object from the normal position is within the restricted area and when the runout of the object from the normal position is outside the restricted area, wherein the reflective member includes a first reflector and a second reflector having different reflectances, wherein the first reflector has a first size corresponding to the non-restricted area, wherein the second reflector has a second size corresponding to the restricted area, wherein the first detection device is configured to detect whether the runout of the object from the normal position is within or outside the non-restricted area by a first difference in the intensity of reflected light detected by the light intensity detecting device, and wherein the second detection device is configured to detect whether the runout of the object from the normal position is within or outside the restricted area by a second difference in the intensity of reflected light detected by the light intensity detecting device.

2. The conveying apparatus according to claim 1, wherein:

the controller is configured to control the conveying operation of the object by the support based on the detection result of the first detection device when the support conveys the object in the non-restricted area, and the controller is configured to control the conveying operation of the object by the support based on the detection result of the second detection device when the support conveys the object in the restricted area.

3. The conveying apparatus according to claim 2, further comprising a position detection device to detect a position of the support along a movement path thereof.

4. The conveying apparatus according to claim 1, wherein the carrier is further configured to travel horizontally at a position above the processing device while holding the support.

5. The conveying apparatus according to claim 4, further comprising a further processing device that does not include the restricted area.

6. The conveying apparatus according to claim 4, wherein at least one of the controller, the carrier and the support is configured to store map information indicating at least one of a location of the restricted area and a location of the non-restricted area in the processing device.

7. The conveying apparatus according to claim 6, wherein the map information includes a location of at least one of the restricted area and the non-restricted area along a movement path of the support.

8. The conveying apparatus according to claim 1, wherein the controller is configured to control a speed of movement of the support along a movement path thereof.

9. The conveying apparatus according to claim 8, wherein the controller is configured to reduce the speed of movement of the support when the second detection device detects that the runout of the object supported by the support from the normal position is outside the restricted area more than when the runout of the object supported by the support from the normal position is within the restricted area.

10. The conveying apparatus according to claim 1, wherein:

the first reflector is larger in size than the second reflector, and the second reflector is installed inside an area where the first reflector is installed.

11. The conveying apparatus according to claim 1, wherein the carrier includes a driver configured to move the support in the vertical direction.

12. A conveying method, comprising:

providing a processing device configured to process an object, the processing device including a platform on which the object to be processed is placed and a cover positioned above the platform;

holding, by a carrier, a support such that the support is movable in a vertical direction;

supporting the object by the support;

conveying the object by the support along the vertical direction between a position above the processing device and a position on the platform of the processing device by moving the support through the cover, in which a non-restricted area and a restricted area narrower than the non-restricted area are defined along a vertical movement path of the support in the processing device, and the restricted area is located inside the cover;

detecting, by a first detection device, whether a runout of the object supported and conveyed by the support from a normal position of the object is within or outside the non-restricted area, the runout being a positional deviation of the object supported and conveyed by the support from the normal position in a direction intersecting the vertical direction;

detecting, by a second detection device, whether the runout of the object supported and conveyed by the support from the normal position of the object is within or outside the restricted area;

controlling, by a controller, a conveying operation of the object by the support based on detection results of the first detection device and the second detection device;

emitting, by a light emitting device provided on the carrier, a light beam toward the support;

reflecting, by a reflective member provided on the support and/or the object, the light beam from the light emitting device, the reflective member including a first reflector and a second reflector having different reflectances, and the first reflector having a first size corresponding to the non-restricted area, the second reflector having a second size corresponding to the restricted area;

detecting, by a light intensity detecting device installed on the carrier, an intensity of light reflected from the reflective member;

detecting, by the first detection device, a first physical quantity that changes between when the runout of the object from the normal position is within the non-restricted area and when the runout of the object from the normal position is outside the non-restricted area;

detecting, by the second detection device, a second physical quantity that changes between when the runout of the object from the normal position is within the restricted area and when the runout of the object from the normal position is outside the restricted area;

detecting, by the first detection device, whether the runout of the object from the normal position is within or outside the non-restricted area by a first difference in the intensity of reflected light detected by the light intensity detecting device; and detecting, by the second detection device, whether the runout of the object from the normal position is within or outside the restricted area by a second difference in the intensity of reflected light detected by the light intensity detecting device.

* * * * *